(12) United States Patent
Srinivasan et al.

(10) Patent No.: US 12,410,532 B2
(45) Date of Patent: Sep. 9, 2025

(54) IMPEDANCE MONITORING OF A MODULAR ELECTROLYSIS SYSTEM

(71) Applicant: OHMIUM INTERNATIONAL, Inc., Incline Village, NV (US)

(72) Inventors: Ramesh Srinivasan, Bangalore (IN); Anil Kumar Adapa, Bangalore (IN); Arne Ballantine, Incline Village, NV (US); Zachary Burpee, San Jose, CA (US)

(73) Assignee: Ohmium International, Inc., Newark, CA (US)

( * ) Notice: Subject to any disclaimer, the term of this patent is extended or adjusted under 35 U.S.C. 154(b) by 1021 days.

(21) Appl. No.: 17/360,153

(22) Filed: Jun. 28, 2021

(65) Prior Publication Data
US 2021/0404078 A1   Dec. 30, 2021

(30) Foreign Application Priority Data
Jun. 26, 2020   (IN) .............................. 202021027158

(51) Int. Cl.
| | |
|---|---|
| *H02M 1/14* | (2006.01) |
| *C25B 1/02* | (2006.01) |
| *C25B 15/023* | (2021.01) |
| *H01M 8/04089* | (2016.01) |
| *H01M 8/04537* | (2016.01) |
| *H01M 8/04664* | (2016.01) |

(Continued)

(52) U.S. Cl.
CPC .............. *C25B 15/023* (2021.01); *C25B 1/02* (2013.01); *H01M 8/04089* (2013.01); *H01M 8/04649* (2013.01); *H01M 8/04679* (2013.01); *H02M 1/007* (2021.05); *H02M 1/14* (2013.01); *H02M 1/4216* (2013.01); *H01M 2008/1095* (2013.01); *H02M 1/4233* (2013.01); *H02M 7/12* (2013.01); *H02M 7/155* (2013.01); *H02M 7/21* (2013.01); *H02M 7/217* (2013.01)

(58) Field of Classification Search
CPC ......... H01M 8/04089; H01M 8/04649; H01M 8/04679; H01M 2008/1095; H02M 1/007; H02M 1/42; H02M 1/4233; H02M 7/12; H02M 7/155; H02M 7/21; H02M 7/217
See application file for complete search history.

(56) References Cited

U.S. PATENT DOCUMENTS

| | | |
|---|---|---|
| 6,351,106 B1 | 2/2002 | Kramer et al. |
| 8,669,499 B2 | 3/2014 | Conrad |

(Continued)

FOREIGN PATENT DOCUMENTS

| | | |
|---|---|---|
| CN | 104426351 A | 3/2015 |
| CN | 104956581 A | 9/2015 |

(Continued)

OTHER PUBLICATIONS

PCT Application No. PCT/US23/18826 International Search Report and Written Opinion dated Oct. 31, 2023.

(Continued)

*Primary Examiner* — Gary L Laxton
(74) *Attorney, Agent, or Firm* — Polsinelli LLP

(57) ABSTRACT

An alternating current (AC) impedance spectroscopy method includes providing an AC impedance spectroscopy ripple from power electronics into an electrochemical device, and absorbing the ripple in the power electronics.

9 Claims, 12 Drawing Sheets

(51) Int. Cl.
*H02M 1/00* (2006.01)
*H02M 1/42* (2007.01)
*H01M 8/10* (2016.01)
*H02M 7/12* (2006.01)
*H02M 7/155* (2006.01)
*H02M 7/21* (2006.01)
*H02M 7/217* (2006.01)

(56) References Cited

U.S. PATENT DOCUMENTS

| | | | |
|---|---|---|---|
| 8,936,704 | B1 | 1/2015 | Li |
| 9,461,319 | B2 | 10/2016 | Sudhan et al. |
| 9,461,320 | B2 | 10/2016 | Ballantine et al. |
| 9,885,759 | B2 | 2/2018 | Schipfer et al. |
| 10,573,910 | B2 | 2/2020 | Sudhan S et al. |
| 10,811,975 | B1 | 10/2020 | Bala et al. |
| 12,166,373 | B2 | 12/2024 | Utz |
| 2004/0199294 | A1 | 10/2004 | Fairlie et al. |
| 2007/0179672 | A1 | 8/2007 | Fairlie et al. |
| 2008/0121525 | A1 | 5/2008 | Doland |
| 2009/0048716 | A1 | 2/2009 | Marhoefer |
| 2009/0189445 | A1 | 7/2009 | Strizki |
| 2009/0303762 | A1 | 12/2009 | Jang et al. |
| 2010/0114395 | A1 | 5/2010 | Hinatsu et al. |
| 2011/0155583 | A1 | 6/2011 | Li |
| 2013/0168236 | A1 | 7/2013 | Zadeh et al. |
| 2013/0201729 | A1 | 8/2013 | Ahsanuzzaman et al. |
| 2013/0224614 | A1 | 8/2013 | Fabian et al. |
| 2014/0021785 | A1 | 1/2014 | Munier et al. |
| 2014/0079593 | A1 | 3/2014 | Naito et al. |
| 2015/0001092 | A1 | 1/2015 | Preston et al. |
| 2015/0072257 | A1 | 3/2015 | Mata et al. |
| 2015/0293179 | A1 | 10/2015 | Schipfer et al. |
| 2016/0013729 | A1 | 1/2016 | Josse et al. |
| 2016/0060776 | A1 | 3/2016 | Kawajiri et al. |
| 2016/0244890 | A1 | 8/2016 | Petipas et al. |
| 2019/0245432 | A1 | 8/2019 | Yan et al. |
| 2019/0259088 | A1 | 8/2019 | Cooper |
| 2019/0288539 | A1* | 9/2019 | Vela Garcia ........ H02M 1/4216 |
| 2019/0296403 | A1 | 9/2019 | Ballantine et al. |
| 2019/0310215 | A1 | 10/2019 | Ballantine et al. |
| 2019/0312317 | A1 | 10/2019 | Ballantine et al. |
| 2019/0317151 | A1 | 10/2019 | Ballantine et al. |
| 2019/0317152 | A1 | 10/2019 | Ballantine et al. |
| 2020/0010961 | A1 | 1/2020 | Kazuno et al. |
| 2020/0295594 | A1 | 9/2020 | Reimann et al. |
| 2021/0155491 | A1 | 5/2021 | Ballantine et al. |
| 2021/0156038 | A1 | 5/2021 | Ballantine et al. |
| 2021/0156039 | A1 | 5/2021 | Ballantine et al. |
| 2021/0179996 | A1 | 6/2021 | Nygren et al. |
| 2021/0317588 | A1 | 10/2021 | Falk et al. |
| 2021/0363651 | A1 | 11/2021 | Seymour et al. |
| 2021/0384815 | A1* | 12/2021 | Kolar ................ H02M 1/14 |
| 2022/0065162 | A1 | 3/2022 | Hunt et al. |
| 2022/0108262 | A1 | 4/2022 | Cella et al. |
| 2022/0220620 | A1 | 7/2022 | Dykstra et al. |
| 2023/0050530 | A1 | 2/2023 | Unru et al. |
| 2023/0170706 | A1 | 6/2023 | Mabe et al. |
| 2023/0198247 | A1 | 6/2023 | Putz et al. |
| 2023/0223861 | A1* | 7/2023 | Everts ................ H02J 7/02 363/125 |
| 2023/0231162 | A1 | 7/2023 | Ballantine et al. |
| 2023/0243055 | A1 | 8/2023 | Pmsvvsv |
| 2023/0302954 | A1 | 9/2023 | Inoue |
| 2023/0332311 | A1 | 10/2023 | Karuppaiah et al. |
| 2023/0332312 | A1 | 10/2023 | Karuppaiah et al. |
| 2023/0332313 | A1 | 10/2023 | Karuppaiah et al. |
| 2023/0332315 | A1 | 10/2023 | Karuppaiah et al. |
| 2023/0332316 | A1 | 10/2023 | Karuppaiah et al. |
| 2023/0333530 | A1 | 10/2023 | Karuppaiah |
| 2023/0335990 | A1 | 10/2023 | Aghatehrani et al. |
| 2023/0352934 | A1 | 11/2023 | Steimer et al. |
| 2024/0124989 | A1 | 4/2024 | Ballantine et al. |
| 2024/0352608 | A1 | 10/2024 | Srinivasan et al. |

FOREIGN PATENT DOCUMENTS

| | | |
|---|---|---|
| CN | 110445365 A | 11/2019 |
| CN | 114337322 A | 4/2022 |
| CN | 115204929 A | 10/2022 |
| CN | 115358806 A | 11/2022 |
| CN | 115796487 A | 3/2023 |
| CN | 115940284 A | 4/2023 |
| CN | 116109037 A | 5/2023 |
| EP | 4172606 A1 | 5/2023 |
| EP | 4511530 | 2/2025 |
| EP | 4511893 | 2/2025 |
| JP | 2015-050934 | 3/2015 |
| JP | 2017-220963 | 12/2017 |
| JP | 2018-066626 | 4/2018 |
| JP | 2019170097 A | 10/2019 |
| JP | 2023531491 A | 7/2023 |
| KR | 10-1452642 B1 | 10/2014 |
| KR | 20170046417 A | 5/2017 |
| KR | 102306918 B1 | 9/2021 |
| TW | 561673 B | 11/2003 |
| TW | 200633356 A | 9/2005 |
| TW | 202219500 A | 5/2022 |
| WO | 2018236649 A1 | 12/2018 |
| WO | WO 2020-051557 A1 | 3/2020 |
| WO | 2021263231 A1 | 12/2021 |
| WO | 2023104267 A1 | 6/2023 |
| WO | 2023141219 A2 | 7/2023 |
| WO | 2023205079 A1 | 10/2023 |
| WO | 2023205082 A1 | 10/2023 |
| WO | 2023205090 A1 | 10/2023 |
| WO | 2023205104 A1 | 10/2023 |
| WO | 2023205126 A1 | 10/2023 |
| WO | 2023205139 A1 | 10/2023 |
| WO | 2023205154 A1 | 10/2023 |
| WO | 2024081426 A1 | 4/2024 |

OTHER PUBLICATIONS

PCT Application No. PCT/US23/11162 Invitation to Pay Additional Fees dated Apr. 17, 2023.
PCT Application No. PCT/US23/11162 International Search Report and Written Opinion dated Jun. 28, 2023.
PCT Application No. PCT/US23/18822 Invitation to Pay Additional Fees dated Jun. 26, 2023.
PCT Application No. PCT/US23/18877 Invitation to Pay Additional Fees dated Jun. 26, 2023.
Notification of Transmittal of the International Search Report and the Written Opinion of the International Searching Authority for International Patent Application No. PCT/US2021/039371, mailed on Oct. 28, 2021, 10 pages.
PCT Application No. PCT/US23/11162, International Preliminary Report on Patentability dated Aug. 2, 2024.
PCT Application No. PCT/US2021/039371, International Preliminary Report on Patentability dated Jan. 5, 2023.
PCT Application No. PCT/US23/18822, International Preliminary Report on Patentability dated Oct. 31, 2024.
PCT Application No. PCT/US23/18934, International Preliminary Report on Patentability dated Oct. 31, 2024.
PCT Application No. PCT/US23/18826, International Preliminary Report on Patentability dated Oct. 31, 2024.
PCT Application No. PCT/US23/18851, International Preliminary Report on Patentability dated Oct. 31, 2024.
PCT Application No. PCT/US23/18911, International Preliminary Report on Patentability dated Oct. 31, 2024.
PCT Application No. PCT/US23/18877, International Preliminary Report on Patentability dated Oct. 31, 2024.
PCT Application No. PCT/US23/18953, International Preliminary Report on Patentability dated Oct. 31, 2024.
U.S. Appl. No. 18/136,093, Non-Final Office Action dated Aug. 28, 2024.
U.S. Appl. No. 18/380,083, Non-Final Office Action dated Jan. 28, 2025.
PCT Application No. PCT/US23/18822 International Search Report and Written Opinion dated Aug. 31, 2023.

(56) References Cited

OTHER PUBLICATIONS

PCT Application No. PCT/US23/18934 International Search Report and Written Opinion dated Aug. 31, 2023.
PCT Application No. PCT/US23/18911 International Search Report and Written Opinion dated Jul. 27, 2023.
PCT Application No. PCT/US23/18877 International Search Report and Written Opinion dated Aug. 31, 2023.
PCT Application No. PCT/US23/18953 International Search Report and Written Opinion dated Aug. 4, 2023.
PCT Application No. PCT/US23/18851 International Search Report and Written Opinion dated Oct. 3, 2023.
PCT Application No. PCT/US23/35152 International Search Report and Written Opinion dated Oct. 31, 2023.
European Search Report Application No. 21829180.5 dated Jun. 24, 2024.
Ding, W. et al., "A Novel Segmented Component Injection Scheme to Minimize the Oscillation of DC-Link Voltage Under Balanced and Unbalanced Conditions for Vienna Rectifier," IEEE Transactions on Power Electronics, vol. 34, No. 10, Oct. 2019, XP011733588, pp. 9536-9551.
Rivera, S. et al., "Electric Vehicle Charging Station Using a Neutral Point Clamped Converter With Bipolar DC Bus," IEEE Transactions on Industrial Electronics, vol. 62, No. 4, Apr. 2015, XP011574565, pp. 1999-2009.
Ye, J. et al., "Simplified Four-Level Inverter-Based Dynamic Voltage Restorer With Single DC Power Source," IEEE Access, vol. 7, Oct. 2019, XP011748357, pp. 137461-137471.
AE Application No. P6002798/2022, First Office Action dated Apr. 24, 2025.
PCT Application No. PCT/US23/35152, International Preliminary Report on Patentability dated Apr. 24, 2025.
TW Application No. 110123618, Office Letter and Search Report dated Mar. 25, 2025.
JP Application No. 2022-578992, Notice of Reasons for Rejection dated Apr. 30, 2025.
U.S. Appl. No. 18/099,151, Non-Final Office Action dated Aug. 12, 2025.

* cited by examiner

IMPEDANCE MONITORING OF A MODULAR ELECTROLYSIS SYSTEM

FIELD

The present disclosure is directed to health and performance monitoring and control for an electrochemical system, such as a proton exchange membrane (PEM) stack system using alternating current impedance spectroscopy derived signals.

BACKGROUND

Electrical circuits in which a cell is either a power source or a load are problematic in that chemical degradation effects can take place for which the only observable symptom or measurement is a degradation in the potential or impedance of the cell. This is problematic for systems implemented in field where the degrading condition is occurring and the only measurement is voltage because there is no way to differentiate between possible failure modes that can cause the degradation and to remedy the degrading condition before the degrading condition becomes permanent or chronic. Alternating current impedance spectroscopy can be used in a laboratory setting to analyze different frequency responses of cells to determine different failure modes. However, for applications in the field, laboratory equipment may not be used because it is not hardened and the resultant ripple from a laboratory signal generator if it were used at a kilowatt or even megawatt scale would be so impactful to use case customers that it would not be permitted.

SUMMARY

According to one embodiment, an alternating current (AC) impedance spectroscopy method includes providing an AC impedance spectroscopy ripple from power electronics into an electrochemical device, and absorbing the ripple in the power electronics.

According to another embodiment, an alternating current (AC) impedance spectroscopy system includes a power factor corrected (PFC) rectifier electrically connectable to an AC power source via an AC split bus and to a direct current DC/DC converter via a DC bus. The PFC rectifier includes a plurality of electric power inverters electrically connectable to respective AC busses of the AC split bus, a first capacitor and a second capacitor electrically connected in parallel to the plurality of electric power inverters via a middle DC bus at a DC-link midpoint; and an auxiliary electric power converter electrically connected to the DC-link midpoint via the middle DC bus and electrically connectable to the direct current (DC)/DC converter via the DC bus.

BRIEF DESCRIPTION OF THE FIGURES

Like reference symbols in the various drawings indicate like elements.

DETAILED DESCRIPTION

Figure 1A:
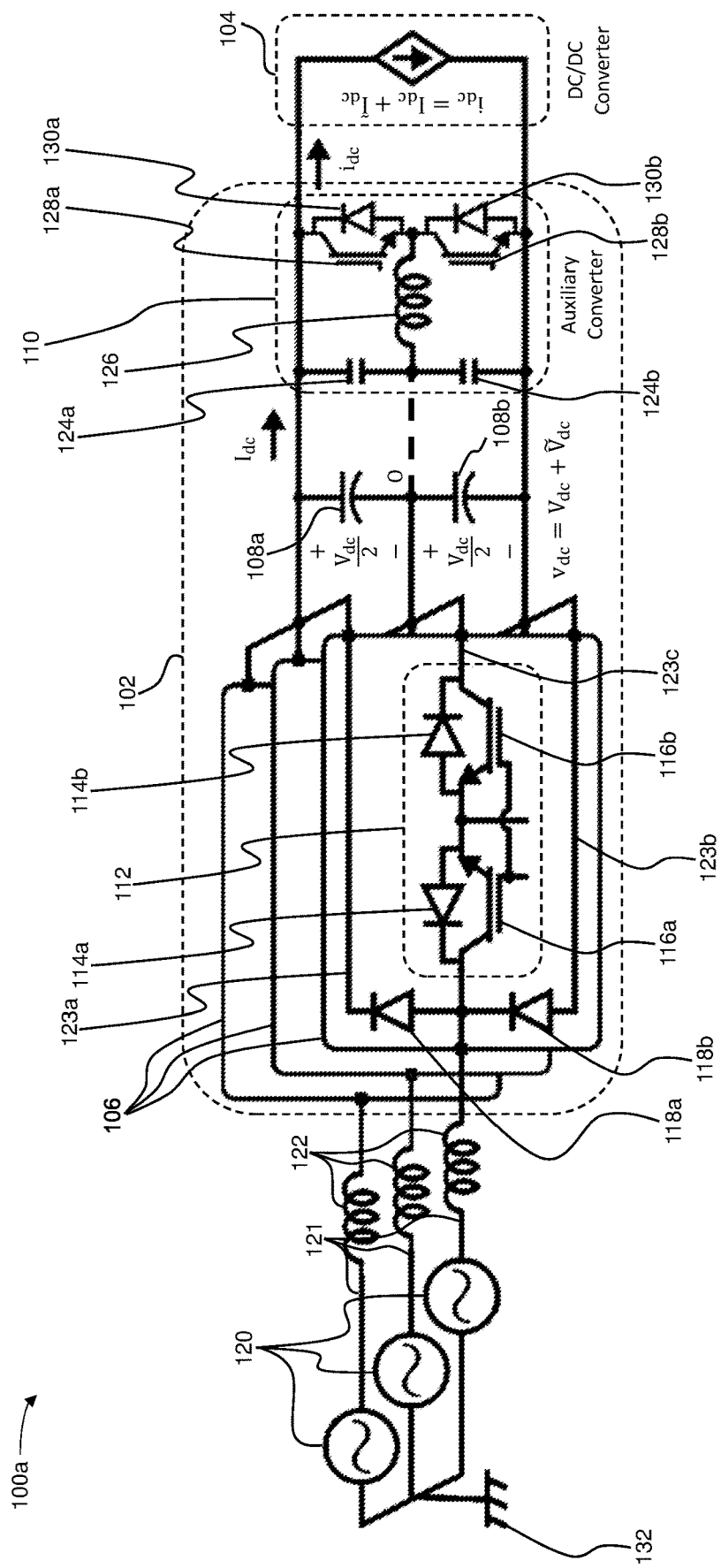
FIGS. 1A and 1B are circuit block diagrams illustrating power electronics hardware configured for alternating current (AC) impedance spectroscopy including a power factor corrected (PFC) rectifier configured for ripple cancelation according to a first embodiment.

The embodiments will now be described more fully hereinafter with reference to the accompanying figures, in which exemplary embodiments are shown. The foregoing may, however, be embodied in many different forms and should not be construed as limited to the exemplary embodiments set forth herein. All fluid flows may flow through conduits (e.g., pipes and/or manifolds) unless specified otherwise.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

The embodiments described herein reference a "cell" as an electric power source and/or an electric load of an electrochemical system, such as a proton exchange membrane (PEM) fuel cell generator, PEM electrolyzer, other PEM unit, and/or other electrochemical system, which may include cells, such as electrochemical cells (e.g., batteries, flow batteries, fuel cells, electrolyzer cells, hydrogen pumping cells, oxygen pumping cells), photovoltaic cells, motors, generators, and other semiconductor junction based cells. In some embodiments, a cell as an electric power source may include electrical or electrochemical ammonia synthesis cells, electrical or electrochemical metal-organic framework cell (MOF-cell) water condenser, electrical or electrochemical oxygen, nitrogen, or air purifiers, electrical or electrochemical water polisher, such as an electrodialysis cell, etc. In some embodiments, a cell as an electric load may include a customer load, (e.g., an electrical system of a building, a facility, an environment conditioning system, a machine, a computer network, etc.), a hydrogen pumping cell, and oxygen generating cell, a MOF-cell, etc. Examples of such PEM electrolyzer cells are described in U.S. patent application Ser. No. 17/101,224, entitled "SYSTEMS AND METHODS OF AMMONIA SYNTHESIS" by Ballantine et al., U.S. patent application Ser. No. 17/101,232, entitled "ELECTROCHEMICAL DEVICES, MODULES, AND SYSTEMS FOR HYDROGEN GENERATION AND METHODS OF OPERATING THEREOF" by Ballantine et al., and U.S. Provisional Patent Application No. 63/057,406, entitled "MODULAR SYSTEM FOR HYDROGEN AND AMMONIA GENERATION WITHOUT DIRECT WATER INPUT FROM CENTRAL SOURCE" by Light et al. the entire contents of each of these references incorporated herein by reference.

Embodiments and examples herein may be described with reference to PEM based electrolyzer stacks (herein PEM stack) for clarity and ease of explanation, and do not limit the scope of the claims and descriptions to PEM stacks as one of skill in the art shall recognize that such embodiments may be similarly applicable to other cells.

Embodiments provide devices and methods of determining the health and points of control for an electrochemical system, such as a PEM stack based system, using alternating current (AC) impedance spectroscopy derived signals. Such devices and methods may be configured to monitor for leakage, errors, deterioration, and overall life quality of a PEM stack using a small AC ripple across a direct current (DC) power input into the PEM stack and reading the frequency of the resultant impedance wave. In some embodiments the AC ripple may sweep through set frequencies and gather data to analyze against predetermined errors and the system may be corrected to clear the error and/or the error may be reported to the owner/customer. The small ripple current should not be higher than the DC current magnitude and should not impact the PEM stack operation or life.

Existing circuit arrangements for AC impedance spectroscopy require the power flow to or from the electrochemical stack to be interrupted and impedance to be monitored by observing the voltage transient response. This method has the substantial disadvantage of requiring an interruption of the power flow. Further, the full breadth of frequency spectrum analysis is not possible with this method.

Existing circuit arrangements for AC impedance spectroscopy also include structures where multiple elements of power electronics are operated 180 degrees out of phase to cancel ripple on the power bus when ripple is applied to the electrochemical stack bus. This has the substantial disadvantage of requiring that multiple circuits be operated in order to create the canceling effect. A single stack circuit is not possible.

Embodiments herein provide power electronics hardware and power electronics control configured for in-situ AC impedance spectroscopy in which the ripple back to a power supply source may be cancelled. Such embodiments avoid the requirement of existing circuit arrangements for AC impedance spectroscopy for multiple segments of power electronics to be operating out of phase to cancel ripple currents.

Embodiments herein provide integration of in-situ AC impedance spectroscopy in an electrochemical system, such as a PEM fuel cell generator, PEM electrolyzer, other PEM unit or other electrochemical system, where the feature of AC impedance spectroscopy is used for system diagnostics and control.

FIGS. 1A-5B illustrate various embodiments of power supply electronics, located in a power supply module of an electrochemical system, such as a PEM fuel cell generator, PEM electrolyzer, other PEM unit or other electrochemical system. The power supply power electronics may be configured to create a specified AC current ripple, superimposed on a DC current supplied to a cell, for, example an electrolyzer stack, such as a PEM stack, in an electrolyzer module.

The resulting ripple back to a power supply source may be canceled so that there is no resulting impact of harmonics to a load for the electrochemical system. In some embodiments, the ripple may be cancelled by ripple canceling power electronics hardware, as described further herein with reference to FIGS. 1A, 1B, 3A, and 3B. In some embodiments, the ripple may be cancelled by ripple canceling controls inside an error correcting loop of the power electronics, as described further herein with reference to FIGS. 2A, 2B, 4A, and 4B. In some embodiments, the ripple may be cancelled by ripple canceling switches, as described further herein with reference to FIGS. 5A and 5B.

A voltage on the electrolyzer stack or groups of cells may be monitored by electronics in the power supply module and/or in the electrolyzer module. A phasor impedance of the electrolyzer stack at the ripple frequency may be determined by comparing a driving current ripple signal with an induced voltage ripple. Multiple impedances at different frequencies may be determined by changing the driving current ripple frequency. In some embodiments, the driving current ripple may be swept through frequencies in a stepwise fashion. In some embodiments, the driving current ripple may be selected frequencies used individually or in small sets to obtain specific impedance data at specific frequencies.

Based on the impedance data, controls may be executed in order to improve the performance and lifetime of the electrolyzer module. The power electronics hardware and power electronics controls described herein may be integrated in tandem with system level controls for diagnostics or function control of the electrochemical system.

Figure 1B:
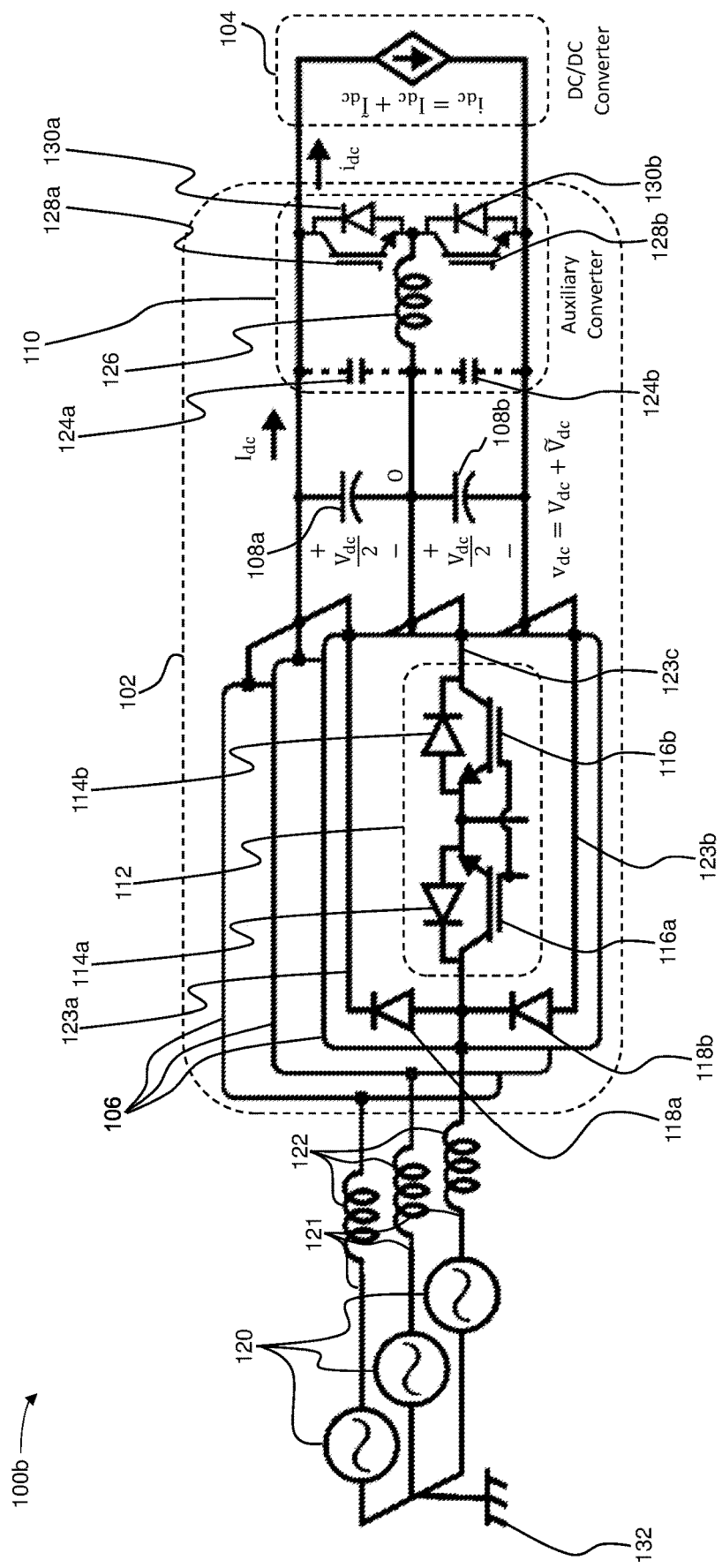

FIGS. 1A and 1B are circuit block diagrams illustrating power electronics hardware 100a, 100b configured for AC impedance spectroscopy including a power factor corrected (PFC) rectifier 102 configured for ripple cancelation according to a first embodiment. With reference to FIGS. 1A and 1B, the power electronics hardware 100a, 100b may be configured to provide electric power to an electrochemical system, such as a PEM fuel cell generator, PEM electrolyzer, other PEM unit or other electrochemical system. The power electronics hardware 100a, 100b may include the PFC rectifier 102 and a DC/DC converter 104, which may be electrically coupled to other components (not shown) of the power electronics hardware 100a, 100b, such as a cell as an electric power source, and/or a cell as an electric load (not shown). The power electronics hardware 100a, 100b may further include or be electrically connectable to an AC power source 120, which may provide a 3-phase AC via an AC bus 121. The AC power source 120 may include a generator, an electric grid, a load bank, etc. The AC power source 120 may be electrically connectable to the PFC rectifier 102 via multiple inductors 122. For example, an inductor 122 may be electrically connectable between different phase outputs of the AC power source 120 and the PFC rectifier 102, such as at least one inductor 122 electrically connectable to a bus of a split AC bus 121. The AC power source 120 may also be electrically connectable to a ground reference 132.

The PFC rectifier 102 may include various components configured for electric power conditioning and for AC impedance spectroscopy. The various components may include any number of electric power inverters 106, which may be electrically connectable to the AC power source 120, such as each of the electric power inverters 106 may be electrically connectable to the AC bus of the split AC bus 121 and at least one respective inductor 122. The PFC rectifier 102 may be electrically connected to the DC/DC converter 104. For example, the electric power inverters 106 may include at least two diodes, such as a first diode 118a and a second diode 118b, and the respective bus of the AC split bus 121 may be electrically connectable between an anode end of the first diode 118a and a cathode end of the second diode 118b. The cathode end of the first diode 118a may be electrically connected to a DC bus 123a and the anode end of the second diode 118b may be electrically connected to a return DC bus 123b. In some embodiments, the DC bus 123a and the return DC bus 123b may have opposite polarities.

In some embodiments, a half-bridge inverter 112 may be incorporated into each of the electric power inverters 106. A first end of the half-bridge inverter 112 may be electrically connected between the anode end of the first diode 118a and the cathode end of the second diode 118b. As such, in some embodiments, the first end of the half-bridge inverter 112 may be electrically connectable to the respective bus of the AC split bus 121 connected between the anode end of the first diode 118a and the cathode end of the second diode 118b. The half-bridge inverter 112 may be electrically connected to a middle DC bus 123c. In some embodiments, the middle DC bus 123c may be a neutral bus. In some embodiments, the half-bridge inverter 112 may include opposingly oriented pairs of paralleled diodes 114a, 114b and transistors 116a, 116b, such as insulated-gate bipolar transistors (IGBTs) or metal-oxide-semiconductor field-effect transistors (MOSFETs). The pairs of paralleled diodes 114a, 114b and transistors 116a, 116b may include a cathode end of a diode 114a, 114b electrically connected to a collector end of a transistor 116a, 116b, and an anode end of the diode 114a, 114b electrically connected to an emitter end of the transistor 116a, 116b. The cathode end of a first diode 114a and the collector end of a first transistor 116a may be electrically connected in parallel between the anode end of the first diode 118a and the cathode end of the second diode 118b. The anode ends of the diodes 114a, 114b and the emitter ends of the transistors 116a, 116b may be electrically connected in parallel to a bus (e.g., bus 122). The transistors 116a, 116b may each include a gate end electrically connected in parallel to a bus. The cathode end of a second diode 114b and the collector end of a second transistor 116b may be electrically connected in parallel to the middle DC bus 123c.

The PFC rectifier 102 may include at least two capacitors, such as a first capacitor 108a and a second capacitor 108b, electrically connected in parallel to the middle DC bus 123c. The first capacitor 108a may be electrically connected to the middle DC bus 123c at a cathode end and electrically connected to the DC bus 123a at an anode end. The second capacitor 108b may be electrically connected to the middle DC bus 123c at an anode end and electrically connected to the return DC bus 123b at a cathode end. The capacitors 108a, 108b may be electrically connected in parallel to the electric power inverters 106 and/or the half-bridge inverters 112 via the middle DC bus 123c. In some embodiments, the capacitors 108a, 108b may be configured to approximately equally divide the DC voltage between the electric power inverters 106 and an auxiliary electric power converter 110 of the PFC rectifier 102. A connection of the capacitors 108a, 108b to the middle DC bus 123c may be a midpoint ("0") for a DC-link of the PFC rectifier 102.

The auxiliary electric power converter 110 may include at least two additional capacitors, such as a first capacitor 124a and a second capacitor 124b, electrically connected in parallel to the middle DC bus 123c. The first capacitor 124a may be electrically connected to the DC bus 123a at a first end and electrically connected to the middle DC bus 123c at a second end. The second capacitor 124b may be electrically connected to the middle DC bus 123c at a first end and electrically connected to the return DC bus 123b at a second end. The capacitors 124a, 124b may be electrically connected in parallel to a filter inductor 126. The filter inductor 126 may be electrically connected to the middle DC bus 123c at a first end and to a second half-bridge inverter at a second end. The second half-bridge inverter has pairs of paralleled transistors 128a, 128b, such as insulated-gate bipolar transistors (IGBTs) or metal-oxide-semiconductor field-effect transistors (MOSFETs), and diodes 130a, 130b. The pairs of paralleled transistors 128a, 128b and diodes 130a, 130b may include a collector end of a transistor 128a, 128b electrically connected to a cathode end of a diode 130a, 130b, and an emitter end of the transistor 128a, 128b electrically connected to an anode end of the diode 130a, 130b. The collector end of a first transistor 128a and the cathode end of a first diode 130a may be electrically connected in parallel to the DC bus 123a. The emitter end of the first transistor 128a and the anode end of the first diode 130a may be electrically connected in parallel to the second end of the filter inductor 126. The collector end of a second transistor 128b and the cathode end of a second diode 130b may be electrically connected in parallel to the second end of the filter inductor 126. The emitter end of the second transistor 128b and the anode end of a second diode 130b may be electrically connected in parallel to the return DC bus 123b.

A DC/DC converter 104 may be electrically connected between the DC bus 123a and the return DC bus 123b. The DC/DC converter 104 may be electrically connectable to any number and combination of other components (not shown) of the power electronics hardware 100a, 100b, such as a cell as an electric power source, and/or a cell as an electric load (not shown).

In some embodiments, a DC-link midpoint ("O") of the PFC rectifier 102 may exist at a connection of the capacitors 108a, 108b and the middle DC bus 123c. Depending on the state of charge of the capacitors 108a, 108b, the DC-link midpoint's availability may vary. When the DC-link midpoint is not accessible, as shown in FIG. 1B, the capacitors 124a, 124b be may be actively connected to the DC middle bus 123c instead of to the DC bus 123a and the DC return bus 123b for use in AC impedance spectroscopy.

The auxiliary electric power converter 110 may be switched, for example, through control of the transistors 130a, 130b in such a way that the auxiliary electric power converter 110 may draw only reactive power from the DC-link, with a specified magnitude and phase angle. The current drawn by the auxiliary electric power converter 110 from the DC-link may be controlled to compensate for a ripple current drawn by the DC/DC converter 104, from the DC-link of the PFC rectifier 102. In some embodiments control of the transistors 128a, 128b and the diodes 130a, 130b may be implemented using any number and combination of controllers (not shown).

Figure 2A:
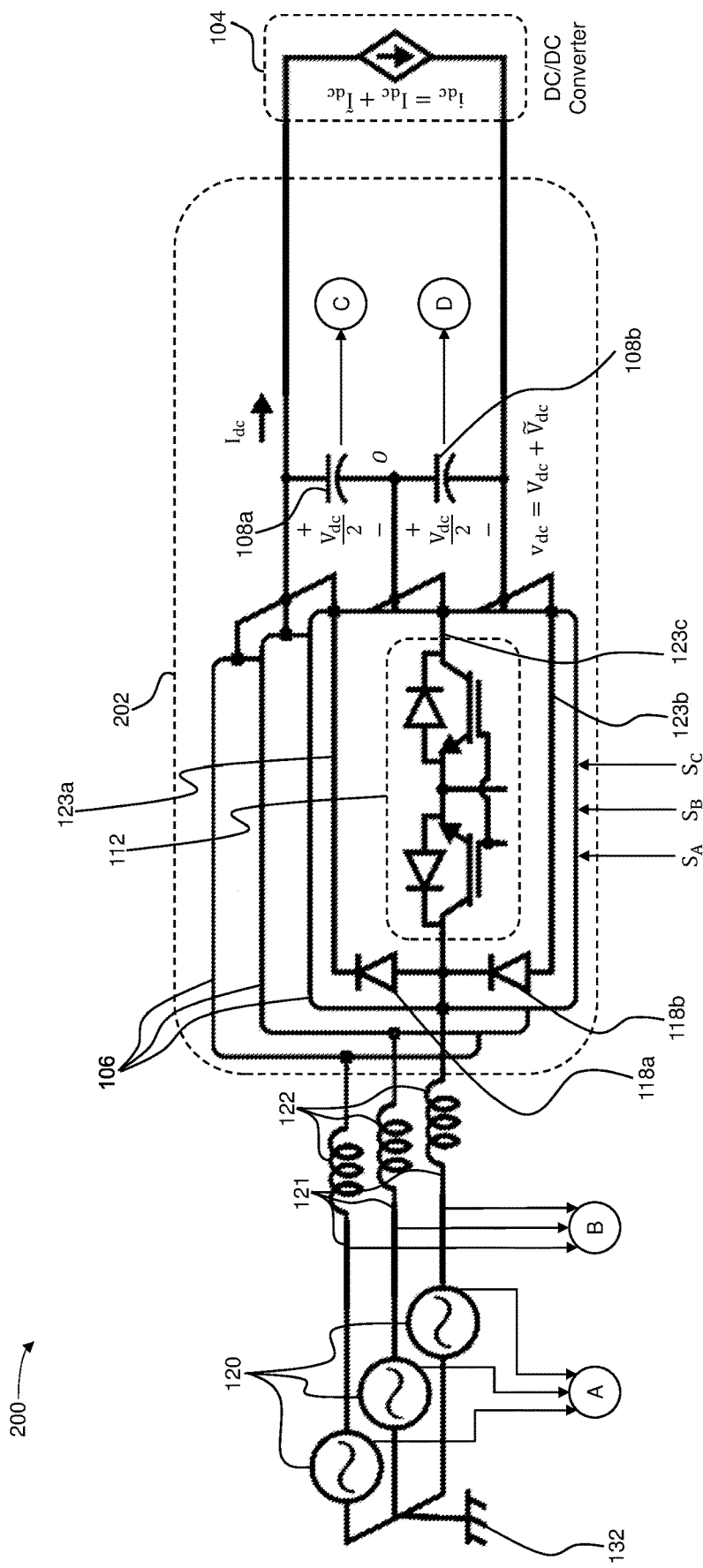
FIGS. 2A and 2B are circuit block and control flow diagrams illustrating power electronics hardware and control configured for AC impedance spectroscopy including digital control of a PFC rectifier for ripple cancelation according to the first embodiment.
Figure 2B:
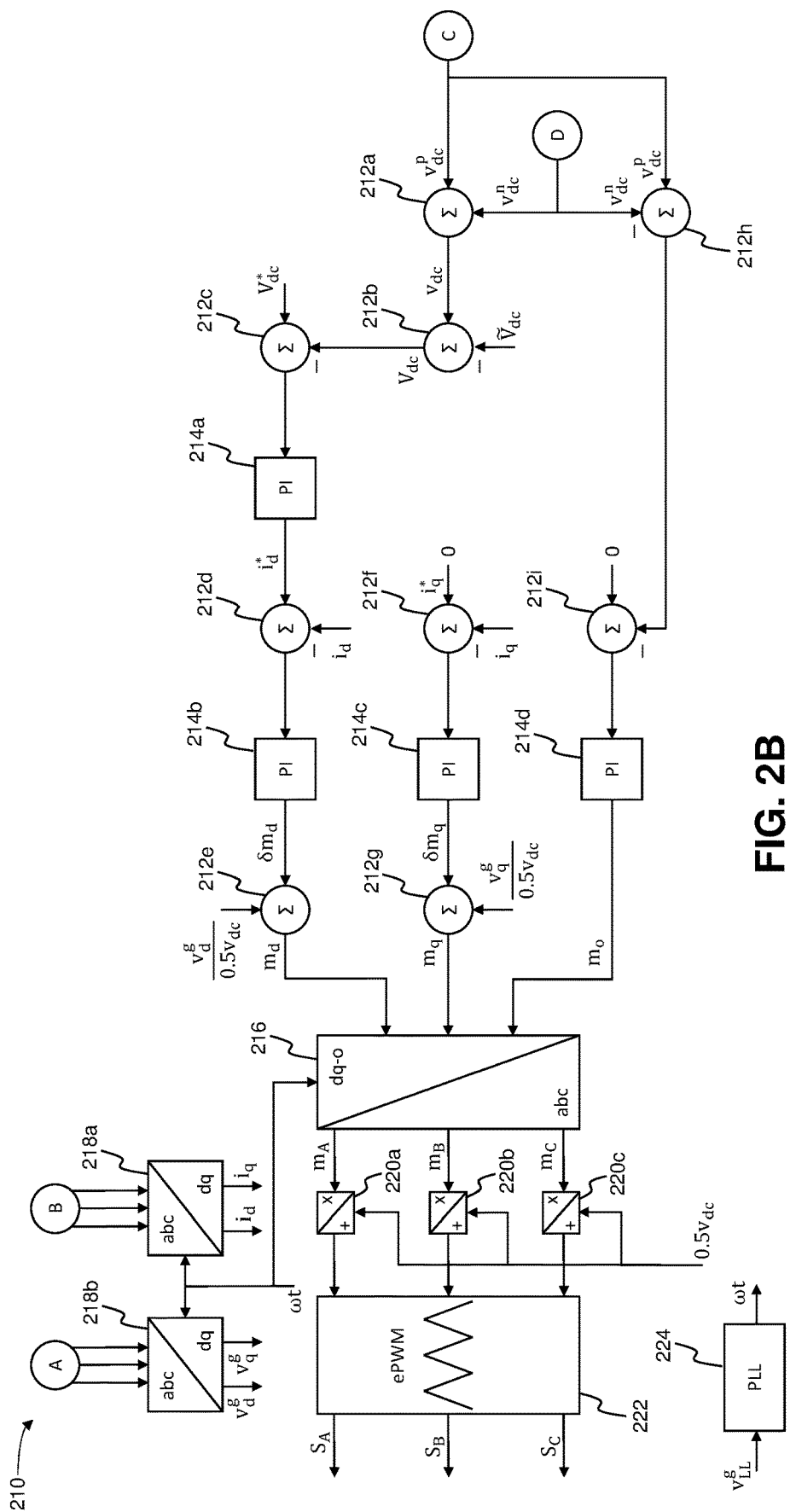

FIGS. 2A and 2B are circuit block and control flow diagrams illustrating power electronics hardware 200 and control 210 configured for AC impedance spectroscopy including digital control of a PFC rectifier 202 for ripple cancelation according to the second embodiment. With reference to FIGS. 1A-2B, like reference numbers in FIG. 2A and FIGS. 1A and 1B may be similarly described, including: the ground reference 132; the AC power source 120; the inductors 122; the electric power inverters 106; the diodes 118a, 118b; the half-bridge inverter 112; the capacitors 108a, 108b; and the DC/DC converter 104. The reference numbers for components of the half-bridge inverter 112 have been omitted for the sake of simplicity and clarity of the drawings. However, components of the half-bridge inverter 112, such as the diodes 114a, 114b and the transistors 116a, 116b, as illustrated in and described with reference to FIGS. 1A and 1B, may be similarly described with reference to FIGS. 2A and 2B.

In some embodiments, the control of the power electronics hardware 200 configured for AC impedance spectroscopy may be implemented by any number and combination of controllers (not shown). For example, a controller may receive signals from the AC power source 120 ("A"), signals from the inductors 122 ("B"), and signals from the capacitors 108a, 108b ("C" and "D"). The signals (A-D) may be representative of voltage and/or current levels at each of the AC power source 120, the inductors 122, and the capacitors 108a, 108b. The controller may use the signals (A-D) to implement control of the power electronics hardware 200 configured for AC impedance spectroscopy, as illustrated, for example, in FIG. 2B.

In the PFC rectifier 202, current loops may operate at high (e.g., several kHz) bandwidth to track current reference commands effectively. Typically, a DC bus voltage control loop would have a lower bandwidth to maintain sinusoidal grid currents, for example at the AC power source 120 ("A") and/or at the inductors 122 ("B"), by providing appropriate current reference command (e.g., "$S_A$", "$S_B$", "$S_C$"). In other words, the DC bus voltage loop bandwidth will be lower when compared to the current loop. The higher and lower bandwidths are relative and depend on the power rating of the underlying equipment.

A ripple voltage on the DC-link of the PFC rectifier 202, due to the converter perturbation for AC impedance spectroscopy at the DC/DC converter 104, may appear at an input error signal of a voltage controller. When the voltage controller error input contains low frequency signals (e.g., signals whose frequency is close to the voltage loop bandwidth or higher, especially around the voltage loop bandwidth), a ripple portion in the error signal may reach an output of the voltage controller. This adds undesirable frequency components to the current reference command. A current controller may ensure proper tracking of the reference command, which may result in injection of a lower frequency signal (related to the frequency perturbation injected by the DC/DC converter 104) into an electric power grid, such as AC power source 120.

To mitigate injection of the low frequency components to the grid, a controller may estimate or find a DC-link ripple voltage based on the known electrical quantities and injected perturbation for the AC impedance spectroscopy, or the controller may track the ripple voltage on the DC-link. The controller may remove the ripple component from a sensed DC-link voltage signal or error input to the controller, such as a DC-link voltage controller. This may prevent propagation of a perturbed voltage ripple in the DC-link from reaching the controller, such as the current controller, and effectively prevent the injection of the low frequency components into the grid.

The controller may implement a number of operations to remove the ripple component from a sensed DC-link voltage signal or error. For example, the controller may receive signals from the AC power source 120 ("A"), signals from the inductors 122 ("B"), and signals from the capacitors 108a, 108b ("C" and "D"). These signals (A-D) may be voltage signals at the respective components. The controller may sum 212a, 212h the signals (C and D), for example to generate a total voltage and a voltage difference of the signals (C and D). The controller may also receive three phase signals (A and B) and convert 218a, 218b three phase signals to voltage and current components in a two-axis reference frame (e.g., d-q). A hardware zero-crossing or digital phase-locked loop operation 224 may determine an angular frequency for converting 218a, 218b three phase signals to voltage and current components. A voltage sensorless control also can be used for determining the grid phase angle or angular frequency.

The total voltage may be further summed 212b with a reactive voltage component to generate a real voltage component. The real voltage component may be summed 212c with a reference real voltage component to generate a voltage difference of the real voltage, which may be converted 214a (e.g., by a proportional and integral ("PI") operation) to generate a corresponding reference current.

Reference currents in the two-axis reference frame may be summed 212d, 212f with the current components in the two-axis reference frame converted from the three phase signal (B) to generate a current differences, of which differentials 214b, 214c (e.g., by a PI operation) may be generated. In some embodiments, a reactive power reference current, summed 212f with a reactive power current, may equal zero. The differentials may be summed 212e, 212g with portions of the voltage components in the two-axis reference frame converted from the three phase signal (A) to generate values in the two-axis reference frame. The voltage difference of the signals (C and D) may be summed 212i with a zero value, from the result of which a value may be generated 214d (e.g., by a PI operation) in a third axis reference. The resultant values may be converted 216 to values in a three-axis reference frame of the received signals (A and B). The values in the three-axis reference frame may be augmented 220a, 220b, 220c by a reference voltage and converted 222 (e.g., by an enhanced pulse width modulation ("ePWM") operation) to generate current reference commands (e.g., "$S_A$", "$S_B$", "$S_C$") that may be provided to the PFC rectifier 202.

In some embodiments in which an AC power source is a cell such as an electrochemical cell, or generator, and power electronics pass this power to a load, and in which the power electronics impart a perturbation, ripple, or sinusoid in sourced current on the cell, device, electrochemical cell or generator such that by monitoring the voltage of the cell or generator, the impedance of that item at the frequency of the perturbation, ripple, or sinusoid may be determined. Further, the power electronics may be configured to cause direct cancelation of the perturbation, ripple, or sinusoid such that it does not pass downstream into a feed to power to a load.

Figure 3A:
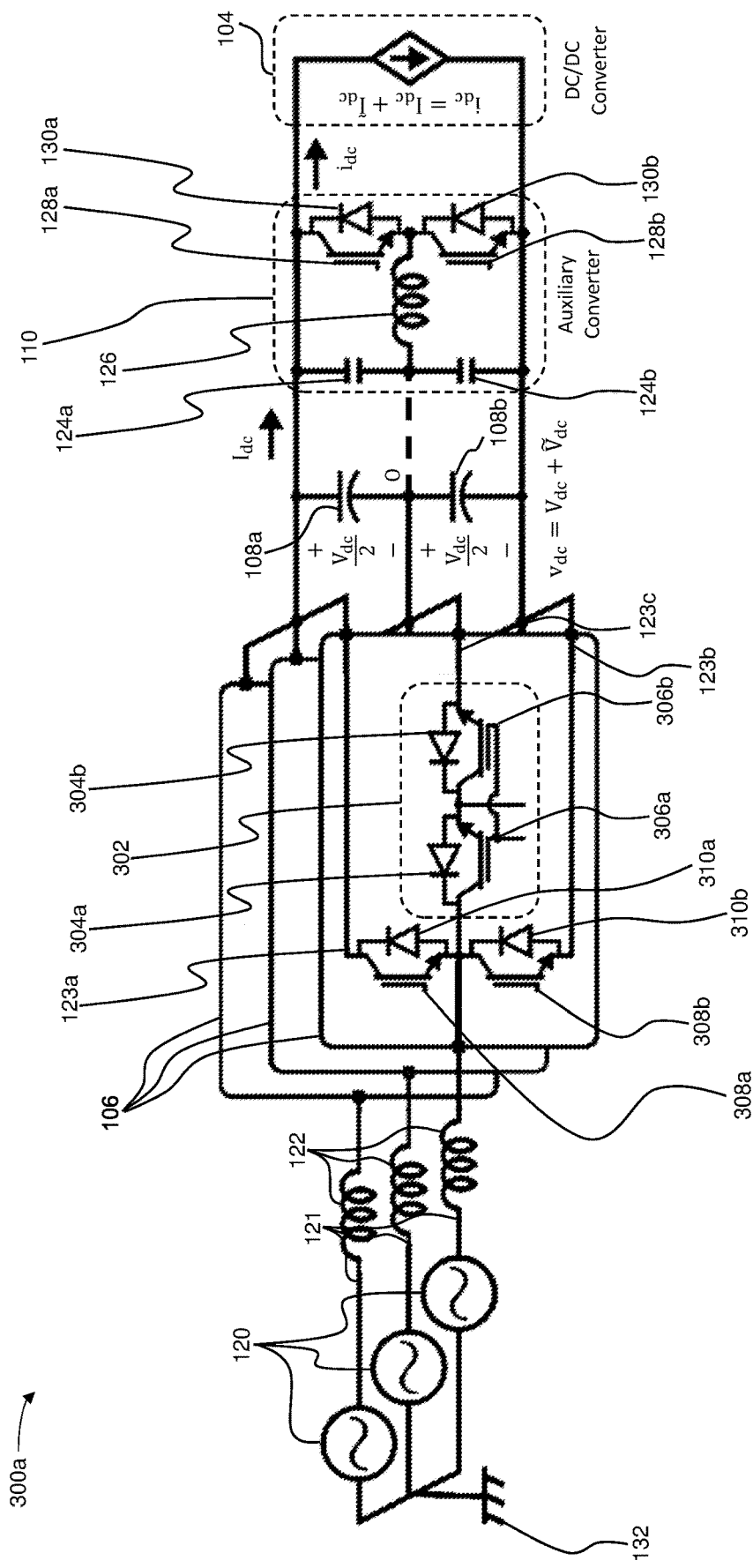
FIGS. 3A and 3B are circuit block diagrams illustrating power electronics hardware configured for AC impedance spectroscopy including a power inverter configured for ripple cancelation according to a second embodiment.
Figure 3B:
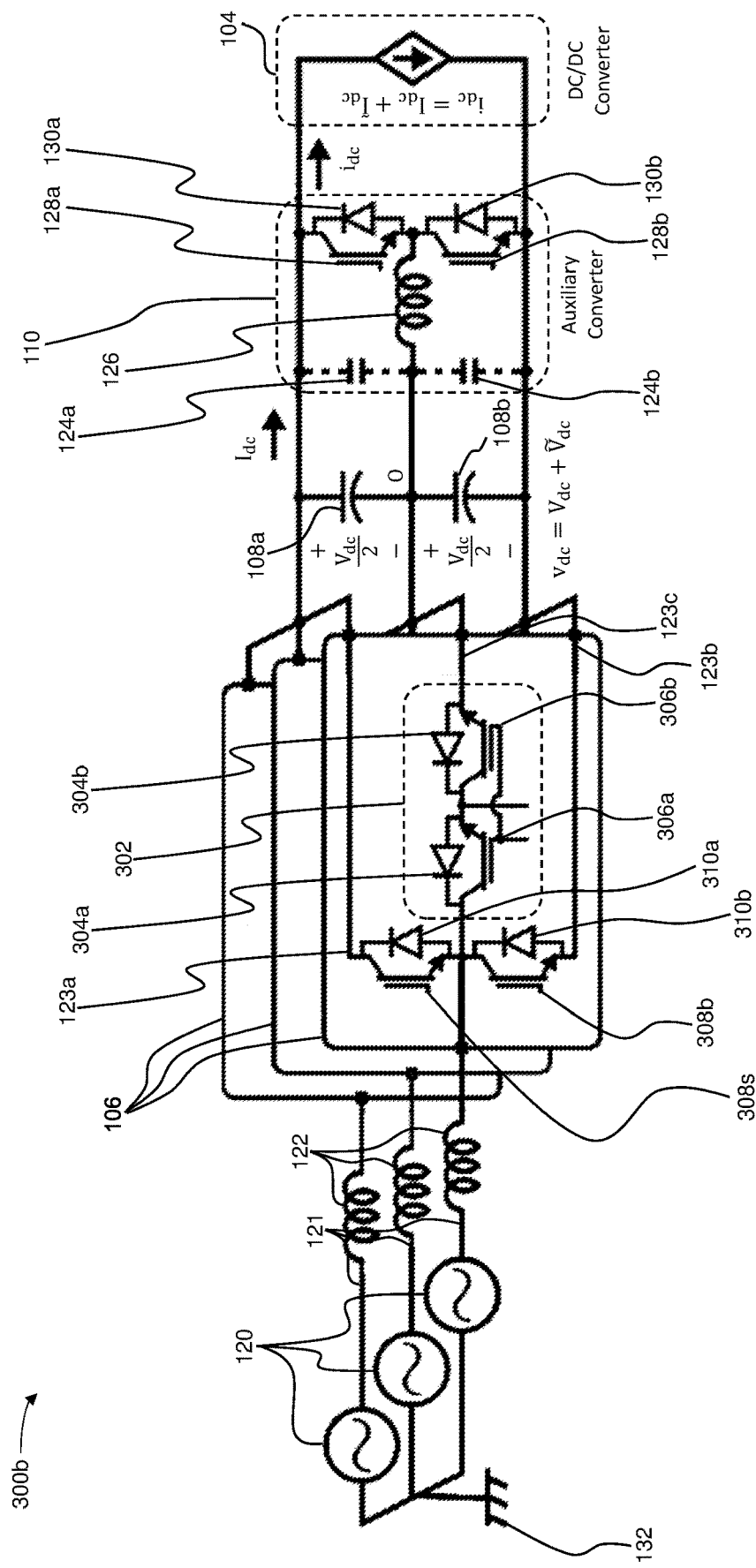

FIGS. 3A and 3B are circuit block diagrams illustrating power electronics hardware 300a, 300b configured for AC impedance spectroscopy including a power inverter configured for ripple cancelation according to a second embodiment. With reference to FIGS. 1A-3B, like reference numbers in FIGS. 3A and 3B, and FIGS. 1A-2B may be similarly described, including: the ground reference 132; the AC power source 120; the inductors 122; the electric power inverters 106; the capacitors 108a, 108b; the auxiliary electric power converter 110; the capacitors 124a, 124b; the filter inductor 126; the transistors 128a, 128b; the diodes 130a, 130b; and the DC/DC converter 104.

The electric power inverters 106 may include at least two pairs of paralleled transistors 308a, 308b, such as insulated-gate bipolar transistors (IGBTs) or metal-oxide-semiconductor field-effect transistors (MOSFETs), and diodes 310a, 310b, instead of the diodes 118a and 118b of the first embodiment shown in FIGS. 1A and 1B. The pairs of paralleled transistors 308a, 308b and diodes 310a, 310b may include a collector end of a transistor 308a, 308b electrically connected to a cathode end of a respective diode 310a, 310b, and an emitter end of the transistor 308a, 308b electrically connected to an anode end of the respective diode 310a, 310b. The collector end of a first transistor 308a and the cathode end of a first diode 310a may be electrically connected in parallel to the DC bus 123a. The emitter end of the first transistor 308a and the anode end of the first diode 310a may be electrically connected in parallel to a respective bus of the AC split bus 121. The collector end of a second transistor 308b and the cathode end of a second diode 310b may be electrically connected in parallel to the respective bus of the AC split bus 121. The emitter end of the second transistor 308b and the anode end of a second diode 310b may be electrically connected in parallel to the return DC bus 123b.

In some embodiments, a half-bridge inverter 302 may be incorporated into each of the electric power inverters 106. A first end of the half-bridge inverter 302 may be electrically connected between the emitter end of the first transistor 308a and the anode end of the first diode 310a, and the collector end of the second transistor 308b and the cathode end of the second diode 310b. As such, in some embodiments, the first end of the half-bridge inverter 302 may be electrically connectable to the respective bus of the AC split bus 122 which is electrically connected between the emitter end of the first transistor 308a and the anode end of the first diode 310a, and the collector end of the second transistor 308b and the cathode end of the second diode 310b. The second end of half-bridge inverter 302 may be electrically connected to the middle DC bus 123c. In some embodiments, the middle DC bus 123c may be a neutral bus. In some embodiments, the half-bridge inverter 302 may include pairs of paralleled transistors 306a, 306b, such as insulated-gate bipolar transistors (IGBTs) or metal-oxide-semiconductor field-effect transistors (MOSFETs), and diodes 304a, 304b. The pairs of paralleled transistors 306a, 306b and diodes 304a, 304b may include a collector end of a transistor 306a, 306b electrically connected to a cathode end of a diode 304a, 304b, and an emitter end of the transistor 306a, 306b electrically connected to an anode end of the diode 304a, 304b. The collector end of a first transistor 306a and the cathode end of a first diode 304a may be electrically connected in parallel between the emitter end of the first transistor 308a and the anode end of the first diode 310a, and the collector end of the second transistor 308b and the cathode end of the second diode 310b. The emitter end of the first transistor 306a and the anode end of the first diode 304a may be electrically connected in parallel to a bus. The collector end of a second transistor 306b and the cathode end of a second diode 304b may be electrically connected in parallel to the bus. The emitter end of the second transistor 306b and the anode end of a second diode 304b may be electrically connected in parallel to the middle DC bus. The transistors 306a, 306b may each include a gate end electrically connected in parallel to a bus.

The capacitors 108a, 108b of the power electronics hardware 300a, 300b may be electrically connected in parallel to the middle DC bus 123c. The first capacitor 108a may be electrically connected to the middle DC bus 123c at the cathode end and the second capacitor 108b may be electrically connected to the middle DC bus 123c at the anode end. The capacitors 108a, 108b may be electrically connected in parallel to the electric power inverters 106 and/or the half-bridge inverters 302 via the middle DC bus 123c.

The active ripple mitigation in the power electronics hardware 300a, 300b for the electric power inverters 106 may be the same as that presented for the PFC rectifier 102 in FIGS. 1A and 1B. When the DC-link mid-point ("O") is not accessible, the capacitors 124a, 124b may create a virtual DC-link midpoint and a wide voltage variation, close to the dc bus voltage, across the capacitors 124a, 124b may be acceptable. By controlling a ripple current magnitude and phase angle, drawn by the auxiliary electric power converter 110 from the DC bus 123a, a voltage ripple across the capacitors 108a, 108b may be mitigated for all inverter loading conditions at different power factors. In some embodiments control of the transistors 308a, 308b, 130a, 130b may be implemented using any number and combination of controllers (not shown).

Figure 4A:
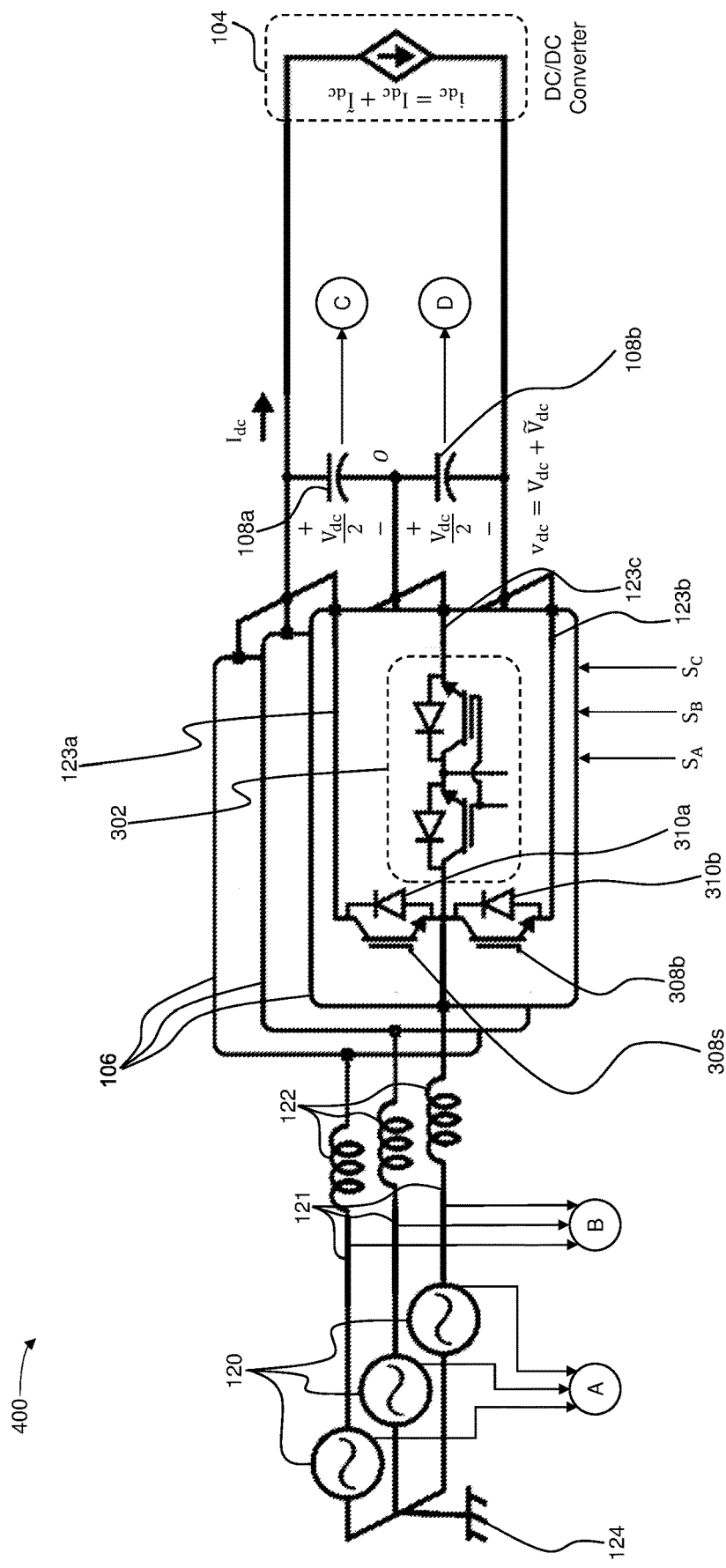
FIGS. 4A and 4B are circuit block and control flow diagrams illustrating power electronics hardware and control configured for AC impedance spectroscopy including digital control of a power inverter for ripple cancelation according to the second embodiment.
Figure 4B:
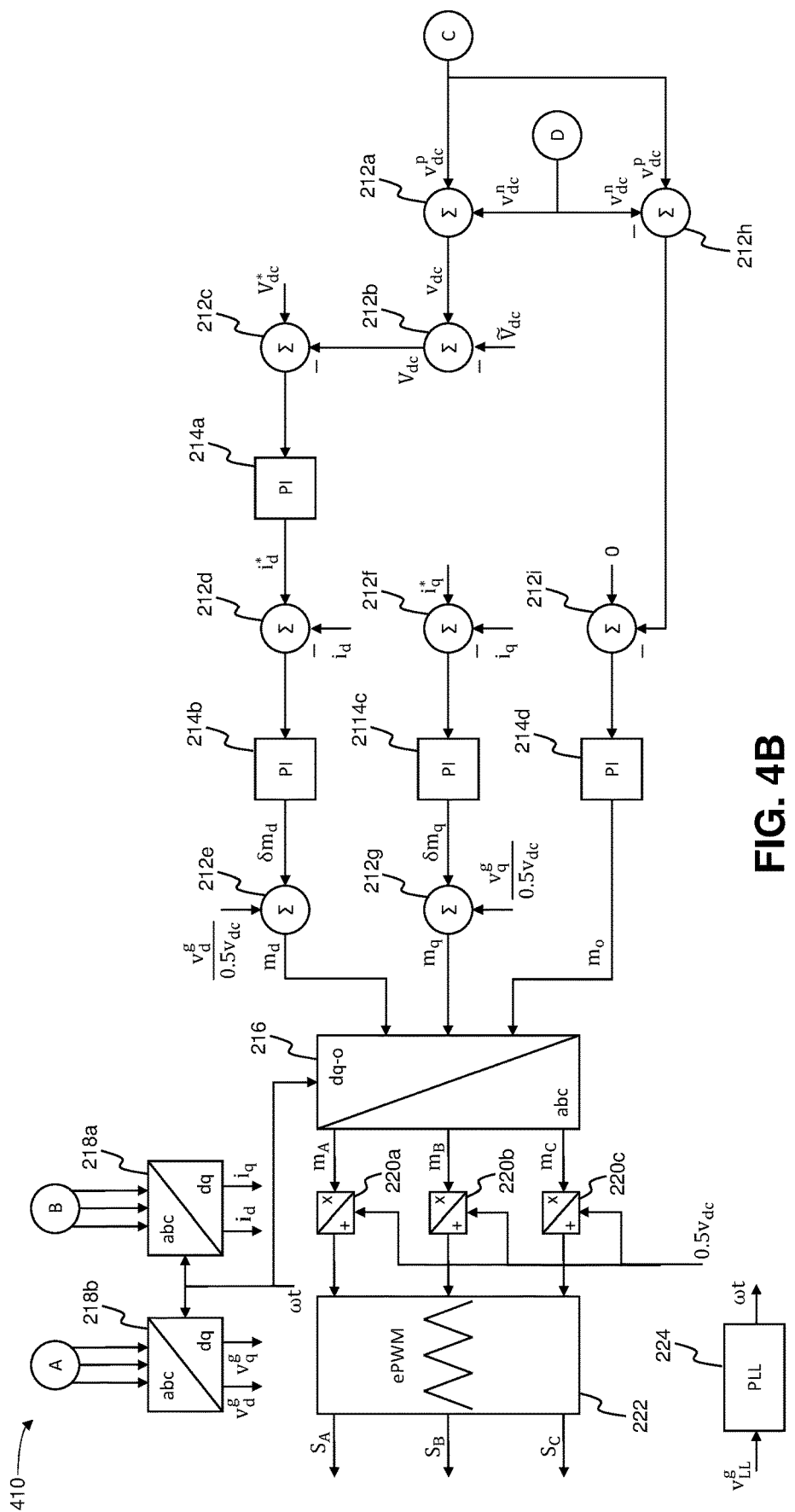

FIGS. 4A and 4B are circuit block and control flow diagrams illustrating power electronics hardware 400 and control 410 configured for AC impedance spectroscopy including digital control of a power inverter for ripple cancelation according to the second embodiment. With reference to FIGS. 1A-4B, like reference numbers in FIG. 4A and FIGS. 1A-2A, 3A, and 3B may be similarly described, including: the ground reference 132; the AC power source 120; the inductors 122; the electric power inverters 106; the transistors 308a, 308b; the diodes 310a, 310b; the half-bridge inverter 302; the capacitors 108a, 108b; and the DC/DC converter 104. The reference numbers for components of the half-bridge inverter 302 have been omitted for the sake of simplicity and clarity of the drawings. However, components of the half-bridge inverter 302, such as the diodes 304a, 304b and the transistors 306a, 306b, as illustrated in and described with reference to FIGS. 3A and 3B, may be similarly described with reference to FIGS. 4A and 4B.

The digital control 210 of the ripple mitigation presented for the PFC rectifier 102 in FIGS. 2A and 2B may be extended for the digital control 410 of the electric power inverters 106 in FIG. 4A. The inverter 106 may be a two level or multilevel inverter. The control architecture for digital control 410 may be the same the control architecture for digital control 210, except there may be two current references (one for real power and one for reactive power). The ripple in the DC-link may propagate to a current reference pertaining to a real power in both inverter 106 in FIG. 4A and PFC rectifier 102 in FIG. 2A. The reactive power in the PFC rectifier 102, such as summed 212f with a real power, may always be zero in FIG. 4B. The real and reactive power may be independent and either positive or negative for the inverter 106, where bidirectional power flow may be possible.

Figure 5A:
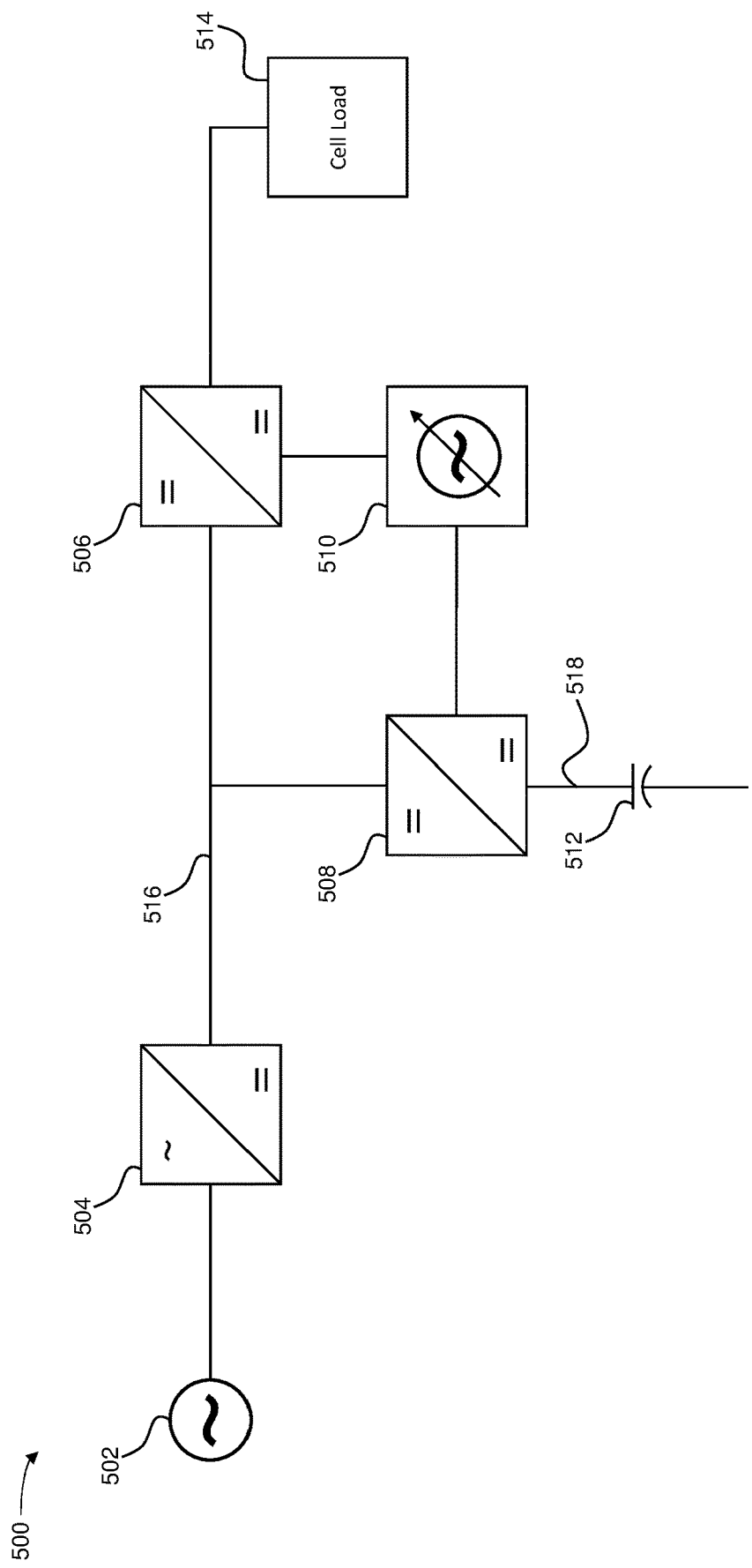
FIGS. 5A and 5B are circuit block diagrams illustrating power electronics hardware configured for AC impedance spectroscopy including a direct current (DC)/DC converter configured for ripple cancelation according to alternative embodiments.
Figure 5B:
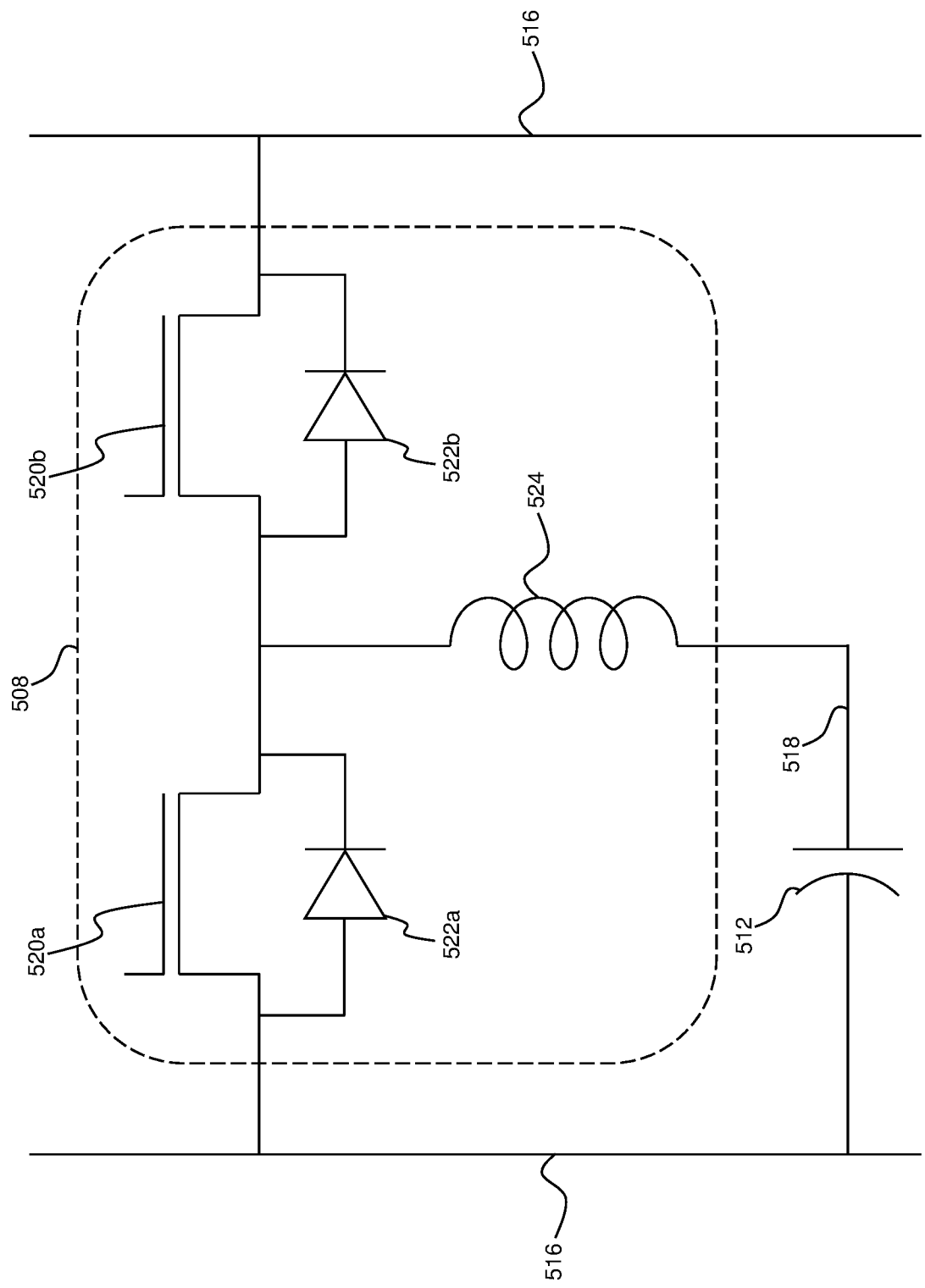

FIGS. 5A and 5B are circuit block diagrams illustrating power electronics hardware 500 including a DC/DC converter 508 and compensating set of switches configured for AC impedance spectroscopy with ripple cancelation according to alternative embodiments. With reference to FIGS. 1A-5B, the power electronics hardware 500 may include a compensating set of switches, an example of which is illustrated in FIG. 5B configured to offset a ripple created and injected into cells as an electric power source and/or cells an electric power load by AC impedance spectroscopy.

The power electronics hardware 500 may include a PFC rectifier 504 (e.g., PFC rectifier 102 in FIGS. 1A-2A and 3A-4A) that may be electrically connectable to an AC power source 502 (e.g., AC power source 120 in FIGS. 1A-2A and 3A-4A). The power electronics hardware 500 may further include a first DC bus 516 electrically connecting the PFC rectifier 504 to at least two DC/DC converters 506, 508 in parallel. In some embodiments, the first DC bus 516 maybe approximately an 800 V bus. In some embodiments, the DC/DC converter 506 (e.g., DC/DC converter 104 in FIGS. 1A-2A and 3A-4A) may be electrically connectable to a cell as a load 514. The DC/DC converters 506, 508 may be electrically connected to an AC sweep generator 510, configured to generate any number and combination of AC signals, such as single AC signals, step AC signals, continuous ranges of AC signals, which may vary in voltage. The AC signals generated by the AC sweep generator 510 may be used by the DC/DC converter 506 to measure impedance of the cell as a load 514. The DC/DC converter 508 may be electrically connected to the split DC bus 516 at an anode end and to a capacitor 512 at a cathode end via a second DC bus 518. In some embodiments, the second DC bus 518 maybe approximately a 400 V bus.

In some embodiments, described with reference to FIG. 5B, the DC/DC converter 508 may include at least two pairs of paralleled transistors 520a, 520b, such as insulated-gate bipolar transistors (IGBTs) or metal-oxide-semiconductor field-effect transistors (MOSFETs), and diodes 522a, 522b. The pairs of paralleled transistors 520a, 520b and diodes 522a, 522b may include a collector end of a transistor 522a, 522b electrically connected to a cathode end of a diode 522a, 522b, and an emitter end of the transistor 520a, 520b electrically connected to an anode end of the diode 522a, 522b. The emitter end of a first transistor 520a and the anode end of a first diode 522a may be electrically connected in parallel to the DC bus 516, such as to a DC return bus of the DC bus 516. The collector end of the first transistor 520a and the cathode end of the first diode 522a may be electrically connected in parallel to an inductor 514, such as a ripple eliminating inductor, as a first end of the inductor 514. The inductor 514, at a second end, may be electrically connected to anode end of the capacitor 512 via the second DC bus 518. The second DC bus 518 may be used to remove a ripple from the DC/DC converter 508, and may not carry any active power. The capacitor 512, at a cathode end, may be electrically connected to the DC bus 516, such as to a DC return bus of the DC bus 516. The emitter end of the second transistor 520b and the anode end of a second diode 522b may be electrically connected in parallel to the first end of the inductor 512. The collector end of a second transistor 520b and the cathode end of a second diode 522b may be electrically connected in parallel to DC bus 516. The AC signals generated by the AC sweep generator 510 may be used by the DC/DC converter 508 to generate an impedance that may be compared against the impedance measured by the bias of the DC/DC converter 506 to generate a bias signal. The DC/DC converter 508 may be a bidirectional converter which is the comparison to the DC/DC converter 506 with which a basis for the measured impedance is formed. The capacitor 512 removes the ripple from the DC/DC converter 508.

In some embodiments, the power electronics hardware 100a, 100b, 200, 300a, 300b, 400, and 500 may be unidirectional. In some embodiments, the power electronics hardware 100a, 100b, 200, 300a, 300b, 400, and 500 may be bidirectional.

In one embodiment, an alternating current (AC) impedance spectroscopy method comprises providing an AC impedance spectroscopy ripple from power electronics into an electrochemical device, and absorbing the ripple in the power electronics.

In one embodiment, the AC impedance spectroscopy ripple is provided from power electronics into the electrochemical device while an operating current or voltage is provided to or from the electrochemical device, such that the AC impedance spectroscopy ripple does interrupt the operation of the electrochemical device.

In one embodiment, the electrochemical device comprises an electrochemical stack, and impedance of different portions of the electrochemical stack is measured separately and compared to each other or to a reference or average impedance value. The method may also include determining a fault in a portion of the electrochemical stack, and electrically bypassing the portion of electrochemical stack containing the fault. The electrochemical stack may comprise a proton exchange membrane (PEM) electrolyzer stack.

In one embodiment, the power electronics comprise a plurality of electric power inverters electrically connectable to respective AC busses of the AC split bus, a first capacitor and a second capacitor electrically connected in parallel to the plurality of electric power inverters via a middle DC bus at a DC-link midpoint, and an auxiliary electric power converter electrically connected to the DC-link midpoint via the middle DC bus and electrically connectable to the direct current (DC)/DC converter via the DC bus. In one embodiment, the auxiliary electric power converter is configured to draw a reactive power amount from the DC-link to cancel the AC impedance spectroscopy ripple. In one embodiment, the method also includes measuring the AC impedance spectroscopy ripple voltage of the DC-link based on voltages at the first capacitor and the second capacitor, and injecting a canceling ripple to the DC-link configured to remove the ripple voltage from the DC-link.

Figure 6:
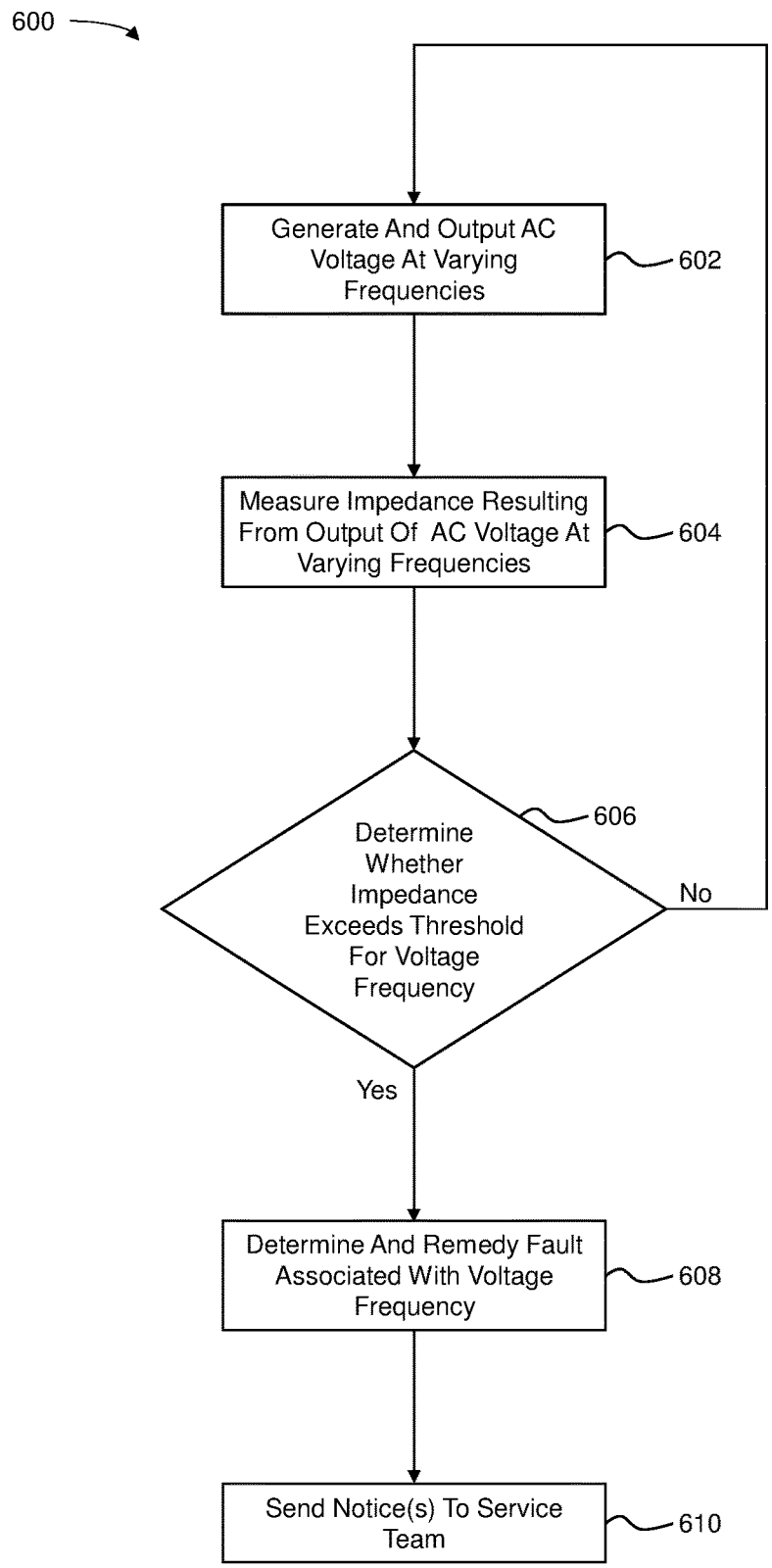
FIG. 6 is a process flow diagrams illustrating an example method of impedance monitoring of a modular electrolysis system according to an embodiment.

With regard to FIG. 6, the method 600 may also include outputting an AC voltage from the power electronics at varying frequencies, measuring an impedance at varying frequencies of the electrochemical device which comprises a proton exchange membrane (PEM) stack, determining whether the measured impedance exceeds a threshold for the AC voltage at a first frequency of the varying frequencies, determining a fault associated with the AC voltage at the first frequency in response to determining that the measured impedance exceeds the threshold for the AC voltage at the first frequency, and remedying the fault.

FIG. 6 is a process flow diagram illustrating an example method 600 of impedance monitoring of a modular electrolysis system according to an embodiment. With reference to FIGS. 1A-5B, the method 600 may be implemented in dedicated hardware, software configured to cause a processor (e.g., a controller) to execute instructions of the software, and/or a combination of dedicated hardware and software executing on a processor. The software may be stored on a non-transitory processor readable medium, such as a volatile memory (e.g., cache, random access memory, buffer, etc.) or nonvolatile memory (fixed or removable storage memory, disk memory, solid state memory, etc.) and loaded to the processor for execution. For example, the method 600 may be implemented as a processor (e.g., controller) executing software within an AC impedance spectroscopy system (e.g., power electronics hardware 100a, 100b, 200, 300a, 300b, 400, and 500 in FIGS. 1A-2A, 3A-4A, 5A, and 5B, power electronics hardware control 210, 410 in FIGS. 2B and 4B) that includes other individual components, and various memory/cache controllers. In order to encompass the alternative configurations enabled in various embodiments, the hardware implementing the method 600 is referred to herein as an "processing device."

In block 602, the processing device may generate and output AC voltage at varying frequencies. The processing device may control various hardware components (e.g., transistors 116a, 116b in FIGS. 1A-2A, transistors 306a, 306b, 308a, 308b in FIGS. 3A-4A, and/or AC sweep generator 510 in FIG. 5A) generate and output AC voltage at varying frequencies. The processing device sweeps through a set of preferred frequencies or an entire spectrum of frequencies. In some embodiments, the AC voltage frequencies may be between approximately 1 Hz and approximately 10 kHz. A maximum frequency of a perturbation may be within a bandwidth of a power electronic converter (e.g., DC/DC converter 104 in FIGS. 1A-2A and 3A-4A, auxiliary electric power converter 110 in FIGS. 1A, 1B, 3A, and 3B, and/or DC/DC converter 506 in FIG. 5A).

In block 604, the processing device may measure impedance resulting from output of the AC voltage at varying frequencies. The processing device may take measurements of the resultant impedance of the AC voltages going through specified systems, such as a cell as a power source and/or a cell as a load. Measurements may be made by the processing device by monitoring voltages and currents at different locations of an AC impedance spectroscopy system (e.g., power electronics hardware 100a, 100b, 200, 300a, 300b, 400, and 500 in FIGS. 1A-2A, 3A-4A, 5A, and 5B, power electronics hardware control 210, 410 in FIGS. 2B and 4B), such as at a power electronic converter (e.g., DC/DC converter 104 in FIGS. 1A-2A and 3A-4A, auxiliary electric power converter 110 in FIGS. 1A, 1B, 3A, and 3B, DC/DC converter 506 in FIG. 5A).

In determination block 606, the processing device may determine whether a measurement of impedance exceeds a threshold for the AC voltage frequency. The processing device may access and retrieve threshold values of impedance for AC voltage frequencies from a memory, stored in association with each other, such as in a data structure or a database. The processing device may compare a measurement of impedance for the AC voltage frequency with the threshold values of impedance for AC voltage frequency to determine whether the measurement of impedance exceeds a threshold for the AC voltage frequency.

In response to determining that the measurement of impedance does not exceed a threshold for the AC voltage frequency (i.e., determination block 606="No"), the processing device may generate and output AC voltage at varying frequencies in block 602. In response to determining that the measurement of impedance does exceed a threshold for the AC voltage frequency (i.e., determination block 606="Yes"), the processing device may determine and handle a fault associated with the AC voltage frequency in block 608. The processing device may access and retrieve fault information, including fault type, processes for remedying or addressing the fault, etc. for the AC voltage frequency from a memory, stored in association with each other, such as in a data structure or a database. The processing device may implement the processes for remedying or addressing the fault.

The following are non-exhaustive examples of faults and processes for remedying the faults for different voltage frequencies. For example, a fault associated with a first voltage frequency may include dryout detection of the PEM, and the fault may be handled by the processing device causing an increase in a humidification function in order to increase inlet stream water content to the PEM stack in order to properly humidify and moisturize the PEM. In some embodiments, each time the fault occurs, the processing device may take account of an environment in and/or around the PEM stack and may run humidification processes increasingly more often and/or at higher levels. In one embodiment, flow direction of a dead-ended PEM stack may be reversed (inlet to outlet reverses to outlet to inlet) by the processing device when PEM dryout is detected via impedance in the range of approximately 1 kHz.

In another example, a fault associated with a second voltage frequency may include poisoning of the PEM. If the fault occurs where there are impurities in the input constituents (e.g., water, pure oxygen) and the PEM is poisoned, a change in the cell impedance spectra may be detected. In some embodiments, the processing device may handle this fault by triggering cell rejuvenation cycles, such as hydrogen pumping from one electrode to another, or an oxidation/reduction cycle of the electrodes. In some embodiments, the processing device may handle this fault by triggering an increased function of impurity filtering mechanisms in the electrochemical system such as water or air or fuel purification.

In another example, a fault associated with a third voltage frequency may include flooding (e.g., accumulation of liquid water) of the PEM, and the fault may be handled by the processing device causing the PEM system controls to execute either a purge of the chambers where flooding is occurring, such as on the anode or cathode of the cell, and/or increasing a rate of recirculation of the anode or cathode to clear the flooding condition. In one embodiment, flooding fault may be detected by the processing device by monitoring the impedance of the PEM stack at a frequency of 1 Hz.

In another example, a fault associated with a fourth voltage frequency may include leakage from the PEM. If a leak occurs, such as detected by the processing device when there is a divergence between electrochemical system function (output flows or output power per input flow) as compared with the baseline impedance spectra, the leakage fault may be handled by the processing device by causing the electrochemical system to adjust and supply more fuel (not running as efficiently) to cover needs. The processing device may send an error code for service in order for the leak to be fixed. An impedance measurement may be taken to determine where the exact leak occurred.

In another example, a fault associated with a fifth voltage frequency may include excess reverse diffusion. If excess reverse diffusion occurs, such as detected by the processing device when there is a divergence of output as compared to cell impedance values, then the electrochemical system will evaluate why the excess happens, and if it is strictly environmental, the excess reverse diffusion fault may be handled by the processing device by causing the electrochemical system to correct itself and decrease input reactant use to minimize reverse diffusion.

In another example, a fault associated with a sixth voltage frequency may include bubble formation on an anode. If bubbles form on the anode plate as detected by the processing device through low frequency impedance monitoring, the processing device may handle this fault by jogging or increasing water flow in order to remove the bubbles.

In another example, a fault associated with a seventh voltage frequency may include insufficient compression. The processing device may detect an insufficient compression fault when impedance spectra indicate that bulk resistance has increased. The processing device may handle this fault by increasing compression may in order to compensate and correct the condition.

In block 610, the processing device may send notice(s) to a service team. In some embodiments, the processing device may send a notice that a fault has occurred. The notice may be specific as to the type of fault detected and/or include AC impedance spectroscopy results, such as an impedance measurement, a voltage frequency, and/or a location in the electrochemical system of the measured impedance. In some embodiments, the processing device may send a notice that the error has been resolved and/or not resolved. In some embodiments, the processing device may send a notice of the impact on the electrochemical system performance.

In some embodiments, the blocks of the method 600 may be implemented in any combination of continuously, periodically, and responsively. For example, blocks 602, 604, 606 may be continuously implemented, even in parallel with the implementation of each other and/or other blocks of the method 600.

In some embodiments, the impedance spectroscopy is used to separately measure the impedance of portions of an electrochemical stack, such as a PEM stack. For example, impedance of one portion of a stack may be compared to an impedance of another portion of the same stack, or to a reference impedance or the average of the stack with impedance values. A differential impedance measurement across portion of the stack may pinpoint the error or fault easier. Furthermore, in addition to the measuring of impedance, the triggering current bypass or shunting of portion (i.e., section) sections of a stack based on impedance will also occur. This provides for a more efficient system which requires less manual service and maintains a longer lifespan. In other words, a defective portion of a PEM stack may be bypassed electrically in case of an error impedance measurement from the defective portion.

In one embodiment, the power electronics hardware 100*a*, 100*b*, 200, 300*a*, 300*b*, 400, and 500 in FIGS. 1A-2A, 3A-4A, 5A, and 5B, power electronics hardware control 210, 410 in FIGS. 2B and 4B place the AC impedance spectroscopy ripple into an electrochemical device, and simultaneously absorbs the ripple so that they can be placed into a DC system or other non-bipolar system without interrupting an operating current or voltage being provided to or from the electrochemical device. In one embodiment, a ripple of complex waveforms, such as multiple superimposed ripples or square waves, may be provided in order to create multiple frequencies for analysis with a single injected ripple waveform.

Figure 7:
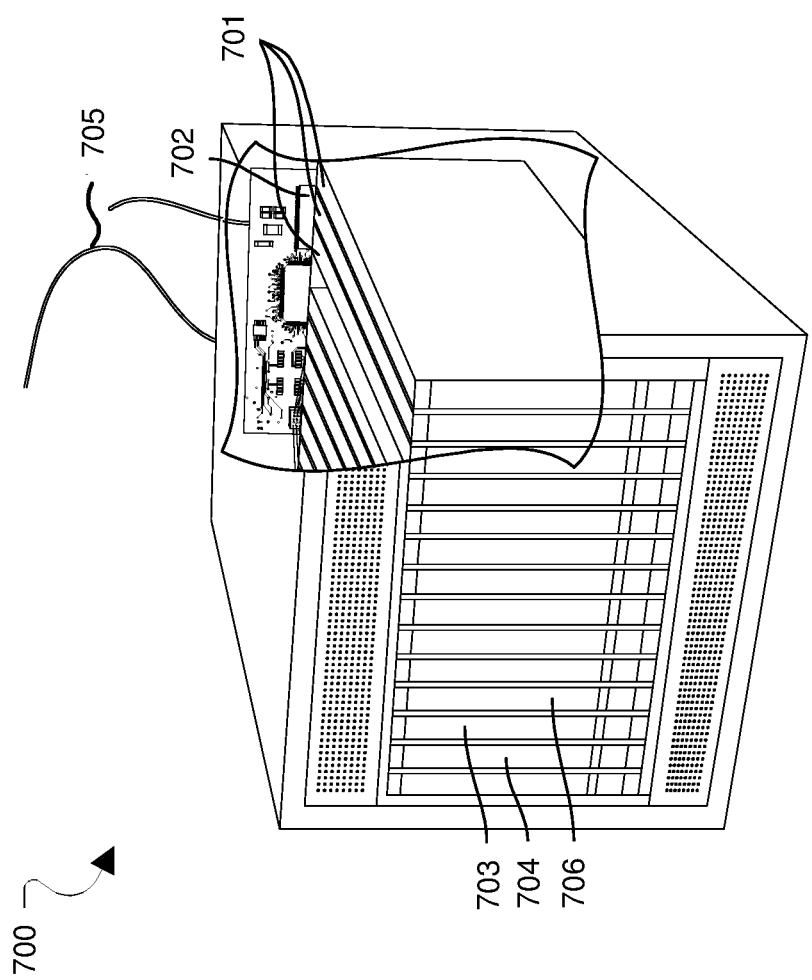
FIG. 7 is a component block diagram illustrating an example computing device suitable for implementing various embodiments.

Various examples (including, but not limited to, the examples discussed above with reference to FIGS. 1A-6) may also be implemented in computing systems, such as any of a variety of commercially and/or proprietary integrated or embedded computing systems. An example computing system 700 is illustrated in FIG. 7. Such a computing system 700 typically includes one or more processor assemblies 701 (e.g., a controller, a CPU, a DSP, an FPGA, an ASIC, etc.) coupled to volatile memory 702 and a large capacity nonvolatile memory 704 (e.g., a disk drive, solid state drive, etc.). The computing system 700 may also include a data port or drive 706 (e.g., a compact disc (CD) or digital versatile disc (DVD) disc drive, a USB port, a serial port, etc.) coupled to the processor assemblies 701. The computing system 700 may also include network access ports 703 coupled to the processor assemblies 701 for establishing network interface connections with a network 705, such as a local area network or wide area network coupled to other broadcast system computers and servers, the Internet, the public switched telephone network, and/or a cellular data network.

With reference to FIGS. 1A-7, the processor assemblies 701 may be any programmable microprocessor, microcomputer, or multiple processor chip or chips that can be configured by software instructions (applications) to perform a variety of functions, including the functions of various examples described above. In some devices, multiple processors may be provided, such as one processor dedicated to wireless communication functions and one processor dedicated to running other applications. Typically, software applications may be stored in the internal memory 702 before they are accessed and loaded into the processor assemblies 701. The processor assemblies 701 may include internal memory sufficient to store the application software instructions. In many devices the internal memory 702 may be a volatile or nonvolatile memory, such as flash memory, or a mixture of both. For the purposes of this description, a general reference to memory refers to memory accessible by the processor assemblies 701, including internal memory 702 or removable memory plugged into the device and memory 702 within the processor assemblies 701, themselves.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. An alternating current (AC) impedance spectroscopy system, comprising:
    a power factor corrected (PFC) rectifier electrically connectable to an AC power source via an AC split bus and to a direct current DC/DC converter via a first DC bus, wherein the PFC rectifier includes:
        a plurality of electric power inverters electrically connectable to respective AC busses of the AC split bus;
        a first capacitor and a second capacitor electrically connected in parallel to the plurality of electric power inverters via a middle DC bus at a DC-link midpoint; and
        an auxiliary electric power converter electrically connected to the DC-link midpoint via the middle DC bus and electrically connectable to the direct current DC/DC converter via the first DC bus, the auxiliary electric power converter configured to draw a reactive power amount from the DC-link to cancel a ripple current drawn by the DC/DC converter and comprising:
            a third capacitor electrically connected in parallel to the first capacitor and a fourth capacitor electrically connected in parallel to the second capacitor; and
            a filtering inductor electrically connected to the third capacitor and the fourth capacitor in parallel, wherein current from the DC-link midpoint is alternately and controllably drawn through the filtering inductor or the third capacitor and the fourth capacitor.

2. The AC impedance spectroscopy system of claim 1, wherein the auxiliary electric power converter includes:
    the filtering inductor having a first end and a second end, wherein the filtering inductor is electrically connected at the first end to the third capacitor and the fourth capacitor in parallel; and
    a half-bridge inverter electrically connected to the second end of the filtering inductor.

3. The AC impedance spectroscopy system of claim 2, wherein the half-bridge inverter comprises:
    a first transistor electrically connected to the second end of the filtering inductor at an emitter end;
    a first diode electrically connected to the second end of the filtering inductor at an anode end and in parallel with the first transistor;
    a second transistor electrically connected to the second end of the filtering inductor at a collector end; and
    a second diode electrically connected to the second end of the filtering inductor at a cathode end and in parallel with the second transistor.

4. The AC impedance spectroscopy system of claim 2, wherein:
    the third capacitor is electrically connected to the first DC bus at a first end and to the middle DC bus and the first end of the filtering inductor at a second end;
    the fourth capacitor is electrically connected to the middle DC bus and the first end of the filtering inductor at a first end, and to a return DC bus at a second end; and
    the half-bridge inverter comprises:
        a first transistor electrically connected to the first DC bus at a collector end;
        a first diode electrically connected to the first DC bus at a cathode end and in parallel with the first transistor;
        a second transistor electrically connected to the return DC bus at an emitter end; and
        a second diode electrically connected to the return DC bus at an anode end and in parallel with the second transistor.

5. The AC impedance spectroscopy system of claim 1, wherein the plurality of electric power inverters each comprise:
    a first diode and a second diode electrically connected to the respective AC bus of the split AC bus in parallel, wherein the first diode is electrically connected to the respective AC bus at an anode end and the second diode is electrically connected to the respective AC bus at a cathode end;
    a first transistor comprising a collector end and an emitter end, the collector end electrically connected to the respective AC bus;
    a third diode comprising a cathode end and an anode end, the cathode end electrically connected to the respective AC bus at and the anode end electrically connected to the emitter end of the first transistor;

a second transistor comprising a collector end and an emitter end, the collector end electrically connected to the middle DC bus and the emitter end electrically connected to the emitter end of the first transistor; and a fourth diode comprising a cathode end and an anode end, the cathode end electrically connected to the middle DC bus at a cathode end and the anode end electrically connected to the emitter end of the second transistor.

6. The AC impedance spectroscopy system of claim 1, comprising a controller configured with controller executable instructions to cause the controller to implement operations comprising:

measuring a ripple voltage of the DC-link based on voltages at the first capacitor and the second capacitor in response to injection of a perturbation to the DC/DC converter; and injecting a canceling ripple to the DC-link configured to remove the ripple voltage from the DC-link.

7. The AC impedance spectroscopy system of claim 1, wherein the auxiliary electric power converter includes a third capacitor and a fourth capacitor electrically connected in parallel to the middle DC bus; and further comprising a controller configured with controller executable instructions to cause the controller to implement operations comprising:

measuring a ripple voltage of the DC-link based on voltages at the third capacitor and the fourth capacitor in response to injection of a perturbation to the DC/DC converter and in response to the first capacitor and the second capacitor being inaccessible; and injecting a canceling ripple to the DC-link configured to remove the ripple voltage from the DC-link.

8. The AC impedance spectroscopy system of claim 1 further comprising one or more additional power factor corrected (PFC) rectifiers electrically connectable to the AC power source via the AC split bus and to the direct current DC/DC converter via the first DC bus.

9. The AC impedance spectroscopy system of claim 8, wherein the one or more PFC rectifiers are connected in parallel to the PFC rectifier, the one or more PFC rectifiers configured to cancel one or more additional ripple currents drawn by the DC/DC converter.

* * * * *